P. H. THOMAS.
VAPOR CONVERTER AND CONTROLLING DEVICE THEREFOR.
APPLICATION FILED JAN. 20, 1905.
1,004,106.
Patented Sept. 26, 1911.
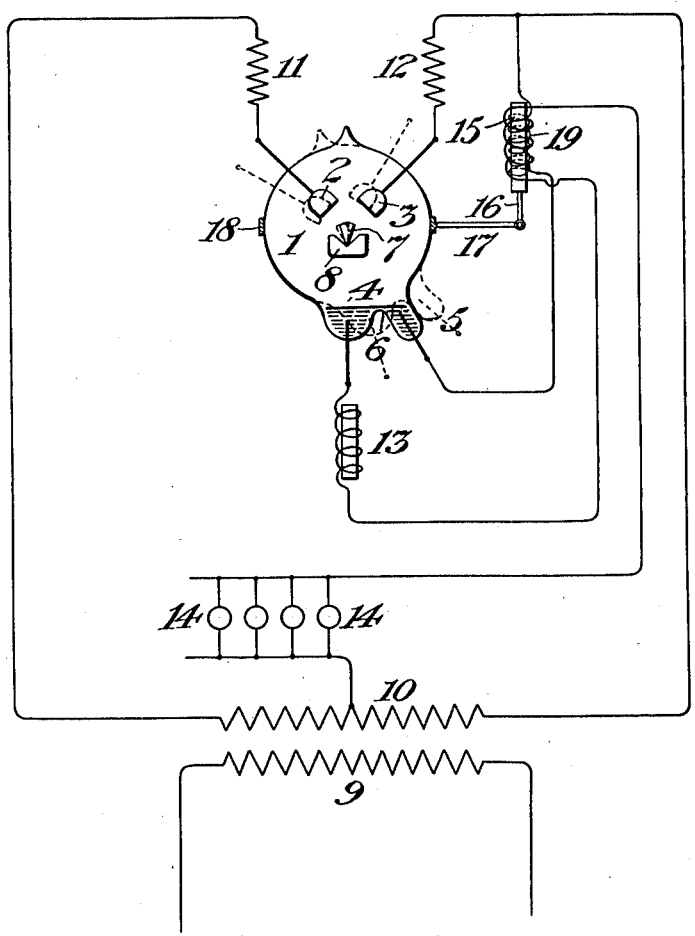

UNITED STATES PATENT OFFICE.

PERCY H. THOMAS, OF MONTCLAIR, NEW JERSEY, ASSIGNOR TO COOPER HEWITT ELECTRIC COMPANY, OF NEW YORK, N. Y., A CORPORATION OF NEW YORK.

VAPOR-CONVERTER AND CONTROLLING DEVICE THEREFOR.

1,004,106.

Specification of Letters Patent. Patented Sept. 26, 1911.

Application filed January 20, 1905. Serial No. 241,934.

*To all whom it may concern:*

Be it known that I, PERCY H. THOMAS, a citizen of the United States, and resident of Montclair, county of Essex, State of New Jersey, have invented certain new and useful Improvements in Vapor-Converters and Controlling Devices Therefor, of which the following is a specification.

The present invention relates to a convenient mode of construction of vapor converter and to circuits connected therewith whereby such a device can be automatically started into operation and maintained in operation without being itself handled by the operator.

The invention will be understood by reference to the present description in connection with the drawing which is a diagram of circuits which may conveniently be used for this purpose in connection with an elevation of a converter capable of being operated as set forth above.

The converter is provided with a container, 1, of any suitable material, and with positive electrodes, 2 and 3, say, of iron, and a negative electrode, 4, of mercury, or other conducting liquid.

The device is also provided with a supplemental electrode, 5, which may also be a liquid, the material of the electrodes 4 and 5 being contained in adjacent pockets between which is a ridge, 6.

When the converter is in the position illustrated in the drawing, the liquid which will hereinafter be described as mercury over runs the ridge 6 so that there is a conducting connection between the mercury in the two adjacent pockets. By tilting the converter, however, into the position illustrated in dotted lines, a separation may be caused between the mercury in the two pockets, the object of which will be explained hereinafter.

The container 1 is provided with knife edges on opposite sides, one of which knife edges is shown at 7. These knife edges rest upon notched supports, one of which appears in the drawing at 8. A similar construction as regards the parts 7 and 8 occurs on the opposite side of the container, but it is not thought necessary to illustrate it specifically.

The alternating current which it is intended that the described converter should rectify may be derived from any suitable source. In the present instance I have illustrated for this purpose a transformer, the primary, 9, of which may be assumed to be connected with any source of alternating current while its secondary, 10, has its terminals connected with the positive electrodes 2 and 3 through suitable resistances 11 and 12. The main negative electrode 4 is connected through an inductance 13 and through a work circuit containing translating devices, 14, 14, to an intermediate point of the secondary 10.

In passing from the negative electrode to the said intermediate point of the secondary, as described, the circuit is at one point coiled around a core, 15, which is connected by a link, 16, to a lever, 17, the latter being joined to a ring or band, 18, closely surrounding the body of the container 1.

Around the same core 15 is wound a fine wire coil, 19, which is connected through one terminal to the supplemental electrode 5 and at the other to the circuit leading to one terminal of the secondary 10.

When it is desired to utilize the described converter for supplying the work-circuit containing the translating devices 14, 14, it is only necessary to operate a switch in the circuit of the primary 9 so as to make the transformer 9, 10 active. Owing to the initial resistance at the negative electrode, no current will immediately pass through the converter but the passage for the current will be found through the fine wire coil 19 to the supplemental electrode 5 by way of the mercury to the negative electrode 4 and thence through the inductance 13, the comparatively coarse wire coil surrounding the core 15, and a work circuit to the middle point of the secondary 10. The core 15 thus becomes energized and is lifted so as to tip the container 1 into the position illustrated in dotted lines, in which position the sides of the support will arrest further movement whereupon the connection between the mercury in the pockets containing the electrodes 4 and 5 is interrupted and the initial negative electrode resistance is locally broken down. After this breaking down takes place, current may flow from either of the main positive electrodes to the negative electrode and the converter is then in operative condition suited for rectifying the alternating currents supplied to it.

One of the coils surrounding the core 15 has been described as a fine wire coil. This coil is cut-out of operation as soon as the described rupture takes place in the mercury. The other coil consists of a very small number of turns and is of comparatively coarse wire so that little energy is consumed in causing it to act as a retaining device for holding the converter in operative position as soon as the converter really becomes active in performing its proper functions.

When the transformer is switched out from operation, the converter returns by gravity to the full line position shown in the drawing and the apparatus is ready for a repetition of the steps described when it is again desired to use the converter. In other words, as soon as the restraint due to the passage of current through the coarse wire coil is removed, the apparatus resumes its original position.

I claim as my invention:—

1. A converter having a plurality of positive electrodes of solid material and a supplemental positive electrode, a negative electrode of conducting liquid material, normal connection between the said main and supplemental electrodes, a main circuit connected to the positive electrodes and to the negative electrode, a supplemental circuit connected in shunt from the main circuit to the supplemental positive electrode, and means operated by the closure of the circuit which includes the supplemental positive electrode for separating the normally connected negative electrodes and starting a local flow of current between the said electrodes.

2. A source of alternating current, a vapor converter having a plurality of positive electrodes and a common negative electrode, connections from the terminals of the source to the positive electrodes, connections from an intermediate point of the source through a work circuit to the common negative electrode, a supplemental positive electrode connected to the main circuit by a shunt connection and also normally connected to the common negative electrode, in combination with means operated by current passing through the shunt circuit for separating the normally connected electrodes for starting the system into operation.

3. A source of alternating current, a vapor converter having a plurality of positive electrodes and a common negative electrode, connections from the terminals of the source to the positive electrodes, connections from an intermediate point of the source through a work circuit to the common negative electrode, a supplemental positive electrode connected to the main circuit by a shunt connection and also normally connected to the common negative electrode, in combination with an electro-magnet having separate windings, one in the main and one in the shunt circuit and connections from the electromagnet to the converter whereby current traversing the shunt circuit will cause a separation of the normally connected electrode for starting the system into operation and current passing through the main circuit will maintain the separation of the said electrodes during operation.

4. A balanced vapor converter provided with suitable knife edges, in combination with notched supports coöperating therewith for limiting the swing of the converter.

5. The combination with a vapor rectifier comprising a hermetically sealed and completely exhausted container and a vaporizable reconstructing cathode and a supplementary anode within the device, of means for the breaking of a current carrying contact between the cathode and the supplementary anode within the device by moving the container, for the purposes of starting, and an electromagnet adapted to be energized by starting current through the apparatus, together with suitable mechanical means whereby the energizing of the electromagnet moves the container for causing a separation between said cathode and said supplementary electrode, and means whereby the container is maintained in the operating position after the starting of normal operation.

6. The combination with an alternating current source, a vapor rectifier comprising a hermetically sealed and completely exhausted container, a vaporizable reconstructing cathode and a plurality of anodes therein, and impedances in connections between said anodes and terminals points of the source, of an electromagnet adapted to start said rectifier connected in a shunt path around one of said impedances and its corresponding anode, together with suitable connections, including a work circuit and a choke coil in the lead from the said cathode to an intermediate point of said source.

7. In a system of electrical distribution, the combination with a direct current work circuit, of a source of alternating current and an hermetically sealed and completely exhausted container including a vaporizable reconstructing cathode and a coöperating anode, said container being mounted upon suitable bearings, an electromagnet passing alternating current from the source to said coöperating anode and adapted on such flow of current to tilt the container and cause a separation of the cathode and the anode, together with suitable connections between the electrodes and the source, the connection of the cathode including said work circuit, whereby when on separation between the cathode and the anode, the rectifier fails to start, the magnet is deënergized and upon the subsequent connection of the last named electrodes repeated tilting of the container is produced.

8. In a system of electrical distribution, the combination with a direct current work circuit, of a source of alternating current and an hermetically sealed and completely exhausted container, a plurality of electrodes and suitable starting means operating therein, an electromagnet operating said starting means in response to current from the source and repeating said operation until the starting means operate successfully, together with suitable connections between the several electrodes and the source and a connection from the cathode including said work circuit, whereby when the energizing of the electromagnet occurs in an unfavorable cycle of the supply, the magnet is deënergized and upon a subsequent energizing of the magnet, the starting operation is repeated.

Signed at New York, in the county of New York, and State of New York, this 17th day of January, A. D. 1905.

PERCY H. THOMAS.

Witnesses:
WM. H. CAPEL,
GEORGE H. STOCKBRIDGE.